US008675941B2

(12) United States Patent
Kiraly et al.

(10) Patent No.: US 8,675,941 B2
(45) Date of Patent: Mar. 18, 2014

(54) METHOD FOR VISUALIZATION OF AIRWAY ANATOMICAL CHANGES (75) Inventors: Atilla Peter Kiraly, Plainsboro, NJ (US); Carol L. Novak, Newtown, PA (US); Benjamin L. Odry, West New York, NJ (US)

(73) Assignee: Siemens Aktiengesellschaft, München (DE)

( * ) Notice: Subject to any disclaimer, the term of this patent is extended or adjusted under 35 U.S.C. 154(b) by 219 days.

(21) Appl. No.: 13/214,482

(22) Filed: Aug. 22, 2011

(65) Prior Publication Data
US 2012/0082358 A1 Apr. 5, 2012

Related U.S. Application Data (60) Provisional application No. 61/388,162, filed on Sep. 30, 2010.

(51) Int. Cl.
*G06K 9/00* (2006.01)
(52) U.S. Cl.
USPC .......................................... 382/131; 382/266
(58) Field of Classification Search
USPC .......... 382/100, 128–132, 219–222, 266, 316
See application file for complete search history.

(56) References Cited

U.S. PATENT DOCUMENTS 7,995,810 B2 * 8/2011 Li et al. ........................ 382/128
8,155,403 B2 * 4/2012 Tschirren et al. ............. 382/128

OTHER PUBLICATIONS

Grauer, Dan, et al. "Pharyngeal airway volume and shape from cone-beam computed tomography: relationship to facial morphology." American Journal of Orthodontics and Dentofacial Orthopedics 136.6 (2009): 805-814.*
Brown, Robert H., Elias A. Zerhouni, and W. A. Y. N. E. Mitzner. "Visualization of airway obstruction in vivo during pulmonary vascular engorgement and edema." Journal of Applied Physiology 78.3 (1995): 1070-1078.*
A.P. Kiraly, G. Mclennan, E.A. Hoffman, J.M. Reinhardt, and W.E. Higgins, entitled "Three-dimensional Human Airway Segmentation Methods for Clinical Virtual Bronchoscopy", Academic Radiology, 2002, pp. 1153-1168, vol. 9(10).
C.I. Fetita, F. Preteux, C. Beigelman-Aubry and P. Grenier, entitled, "Pulmonary Airways: 3-D Reconstruction From Multislice CT and Clinical Investigation", IEEE Transactions on Medical Imaging, Nov. 2004, vol. 23, No. 11.
A.P. Kiraly, J.P. Helferty, E.A. Hoffman, G. McLennan, and W.E. Higgins, entitled "Three-Dimensional Path Planning for Virtual Bronchoscopy", IEEE Transactions on Medical Imaging, Sep. 2004, pp. 1365-1379, vol. 23, No. 9.
B. Odry, A. P. Kiraly, G. Slabaugh, and C. L. Novak, entitled "Active contour approach for accurate quantitative airway analysis", SPIE Medical Imaging 2008, Proceedings of the SPIE, 2008, p. 691613, vol. 6916.
A. P. Kiraly, B. L. Odry, D. P. Naidich, and C. L. Novak, entitled "Boundary-Specific Cost Functions for Quantitative Airway Analysis", Medical Image Computing and Computer Assisted Intervention (MICCAI) 2007, pp. 784-791.
J. N. Kaftan, A.P. Kiraly, D. P. Naidich, and C. L. Novak, entitled "A Novel Multi-Purpose Tree and Path Matching Algorithm with Application to Airway Trees", Medical Imaging 2006, Proceedings of the SPIE , 2006, pp. 215-224, vol. 6143.

* cited by examiner

*Primary Examiner* — Shefali Goradia
(74) *Attorney, Agent, or Firm* — Donald B. Paschburg (57) ABSTRACT A method (100) that evaluates the contours of patient airways and visualizes anatomical changes to the airways.

30 Claims, 8 Drawing Sheets

METHOD FOR VISUALIZATION OF AIRWAY ANATOMICAL CHANGES

CROSS-REFERENCE TO RELATED APPLICATIONS

This application claims the benefit of Provisional U.S. Patent Application Ser. No. 61/388,162 entitled, "Method for Visualization of Airway Anatomical Changes", filed in the name of Benjamin L. Odry, Carol L. Novak, and Atilla Peter Kiraly on Sep. 30, 2010, the disclosure of which is hereby incorporated by reference herein.

FIELD OF INVENTION

The present invention relates to anatomical visualization. More particularly, the present invention relates to the visualization of airway disease progression and/or airway treatment response.

BACKGROUND OF THE INVENTION

Pulmonary diseases such as bronchiectasis, asthma, cystic fibrosis and chronic obstructive pulmonary disease (COPD) are characterized by abnormalities in airway dimensions, including the thickness of the walls and the size of the lumen (i.e., the inner airway). Computed tomography (CT) has become one of the primary means to depict and detect these abnormalities since the availability of high-resolution, near-isotropic data makes it possible to evaluate airways that are at oblique angles to the scanner plane. However, at present, clinical evaluation of the airway tree is typically limited to subjective visual inspection only. Systematic evaluations of the airways, which would take advantage of high-resolution data, have not proved practical without substantial automation.

Also, many patients with airway disease are followed after an initial assessment in order to monitor disease progression or treatment response. In this situation, a prior and a follow-up dataset may be compared side-by-side in order to determine whether the patient's airway abnormalities are increasing or decreasing. However, this task is even more difficult to perform rigorously than the evaluation of a single time-point dataset since multiple airways must be visually compared. A method for systematic evaluation of anatomical changes resulting from treatment would be highly valuable for evaluating patients undergoing treatments. If a treatment is ineffective, it would be highly beneficial to determine this quickly and objectively in order to discontinue the course of treatment and its side effects. Furthermore, a systematic evaluation would benefit researchers developing new treatments to rapidly determine which ones show promise.

In many instances, visualization of change provides benefits over simple, numeric measurements, especially in radiology where physicians and health professionals are trained to rely on visual assessments.

SUMMARY OF THE INVENTION

The aforementioned problems are obviated by the present invention which provides a method of visualizing changes in an anatomical airway, comprising obtaining image data of a first anatomical airway and a second anatomical airway; identifying branches of the first anatomical airway to be visualized and branches of the second anatomical airway that are respective counterparts to the identified branches of the first anatomical airway; deriving the contours of each identified branch and the counterpart branch from the image data; evaluating the contours of each identified branch relative to the corresponding contours of the counterpart branch; and visualizing in a coded manner the differences between the contours of each identified branch and the corresponding contours of the counterpart branch. Obtaining image data may comprise obtaining an image of a CT volume of the first anatomical airway and an image of a CT volume of the second anatomical airway. In such case, obtaining an image of a CT volume may comprise obtaining an image directly subsequent to respective CT scans of the first anatomical airway and the second anatomical airway; from an image data archive or database of a CT imaging system; or from a remote computer network operably connected to a CT imaging system. Also, obtaining an image may further comprise creating respective airway tree models of the first anatomical airway and the second anatomical airway. The creating step may comprise performing a segmentation of a respective image and performing a skeletonization of the segmented image. Also, the image of the CT volume of the second anatomical airway may comprise the image of the CT volume of the first anatomical airway obtained at an earlier or later time-point.

The deriving step may comprise performing airway quantification of each identified branch and the counterpart branch. The evaluating step may comprise determining respective cross-sectional views of each identified branch and counterpart branch and overlaying the contours of an identified branch onto the cross-sectional view of the counterpart branch. Alternatively, the evaluating step may comprise determining respective cross-sectional views of each identified branch and counterpart branch and overlaying the contours of an identified branch and the contours of the counterpart branch onto the same cross-sectional view of the counterpart branch. In such case, the evaluating step may further comprise registering the respective cross-sectional views of each identified branch and counterpart branch. The determining step may comprise determining respective fillet cross-sectional views of each identified branch and counterpart branch, the respective fillet cross-sectional views of an identified branch and counterpart branch being taken at a same cross-section angle or determining respective fillet cross-sectional views of each identified branch and counterpart branch, the respective fillet cross-sectional views of an identified branch and counterpart branch being taken over a same set of cross-section angles to produce respective sets of fillet cross-sectional views.

The evaluating step may also comprise categorizing a difference between the contours as a positive region if the difference corresponds to the contour of an identified branch being larger than the corresponding contour of the counterpart branch and as a negative region if the difference corresponds to the contour of an identified branch being smaller than the corresponding contour of the counterpart branch. The categorizing step may comprise determining the respective amounts of difference between the contours for each positive region and for each negative region. In such case, the determining step may comprise determining the respective amounts of difference between the contours for each positive region that are greater than a selected threshold amount and the respective amounts of difference between the contours for each negative region that are greater than a selected threshold amount.

The visualizing step may comprise providing a coded visualization of the differences between the contours that distinguishes between positive regions and negative regions. Alternatively, the visualizing step may comprise providing a color-coded visualization of the differences between the contours that uses a discrete color to represent positive regions and a discrete, different color to represent negative regions or providing a color-coded visualization of the differences between the contours that uses a continuous color scale representing respective degrees of differences with respect to positive and negative regions. The visualizing step may also comprise providing a coded visualization of the differences between the contours that distinguishes between positive regions and negative regions and controllably switching the coded visualization from respective fillet cross-sectional views of an identified branch and counterpart branch taken at a first cross-section angle to the respective fillet cross-sectional views of the identified branch and counterpart branch taken at a second cross-section angle.

The present invention also provides a computer-assisted method of assessing anatomical changes of an airway, comprising analyzing the contours of a selected branch of the airway imaged at a first time-point and the contours of a corresponding branch of the airway imaged at a second time-point and visualizing the anatomical differences in the contours. The analyzing step may comprise determining from the first time-point and the second time-point images respective cross-sectional views of the selected branch and the corresponding branch and overlaying the contours of the selected branch onto the cross-sectional view of the corresponding branch to show anatomical differences in the contours from the first time-point to the second time-point. Alternatively, the analyzing step may comprise determining from the first time-point and the second time-point images respective cross-sectional views of the selected branch and the corresponding branch and overlaying the contours of the selected branch and the contours of the corresponding branch onto the same cross-sectional view of the corresponding branch to show anatomical differences in the contours from the first time-point to the second time-point.

In addition, the analyzing step may comprise determining the anatomical differences in the contours from the first time-point to the second time-point by identifying the contour regions that undergo shrinkage and the contour regions that undergo dilatation. In such case, the analyzing step may comprise categorizing the anatomical differences in the contours from the first time-point to the second time-point by determining the respective amounts of shrinkage of contour regions that undergo shrinkage and the respective amounts of dilating of contour regions that undergo dilatation. Alternatively, the analyzing step may comprise categorizing the anatomical differences in the contours from the first time-point to the second time-point by determining the respective amounts of shrinkage of contour regions that undergo shrinkage that are greater than a selected threshold and the respective amounts of dilating of contour regions that undergo dilatation that are greater than a selected threshold.

The visualizing step may comprise providing a coded visualization of the anatomical differences in the contours from the first time-point to the second time-point that distinguishes between contour regions that undergo dilatation and contour regions that undergo shrinkage. Alternatively, the visualizing step may comprise providing a color-coded visualization of the anatomical differences in the contours from the first time-point to the second time-point that uses a discrete color to represent contour regions that undergo dilatation and a discrete, different color to represent contour regions that undergo shrinkage or providing a color-coded visualization of the anatomical differences in the contours from the first time-point to the second time-point that uses a continuous color scale representing respective degrees of change with respect to the dilatation and shrinkage of contour regions from the first time-point to the second time-point. The visualizing step may further comprise providing respective indexes of dilatation and shrinkage for an airway lumen and airway walls to accompany the coded visualization.

The present invention also provides a system for visualizing changes in anatomical airways, comprising a CT imaging system having an imager that images the anatomical airways to acquire image data and a processor that manipulates the acquired image data and stored image data to perform airway quantification of selected airways and of a counterpart set of airways; to evaluate the contours of the selected airways relative to corresponding contours of the counterpart set of airways; and to obtain a coded visualization of the differences between the contours of the selected airways and the corresponding contours of the counterpart set of airways.

DESCRIPTION OF THE DRAWINGS

For a better understanding of the present invention, reference is made to the following description of an exemplary embodiment thereof, and to the accompanying drawings, wherein:

FIG. 4b shows an overlay of post-treatment contours on the post-treatment cross-section of an airway branch of FIG. 4a;

FIG. 5 shows an overlay of both pre-treatment and post-treatment contours on the post-treatment cross-section of an airway branch of FIG. 4a;

DETAILED DESCRIPTION

Figure 1:
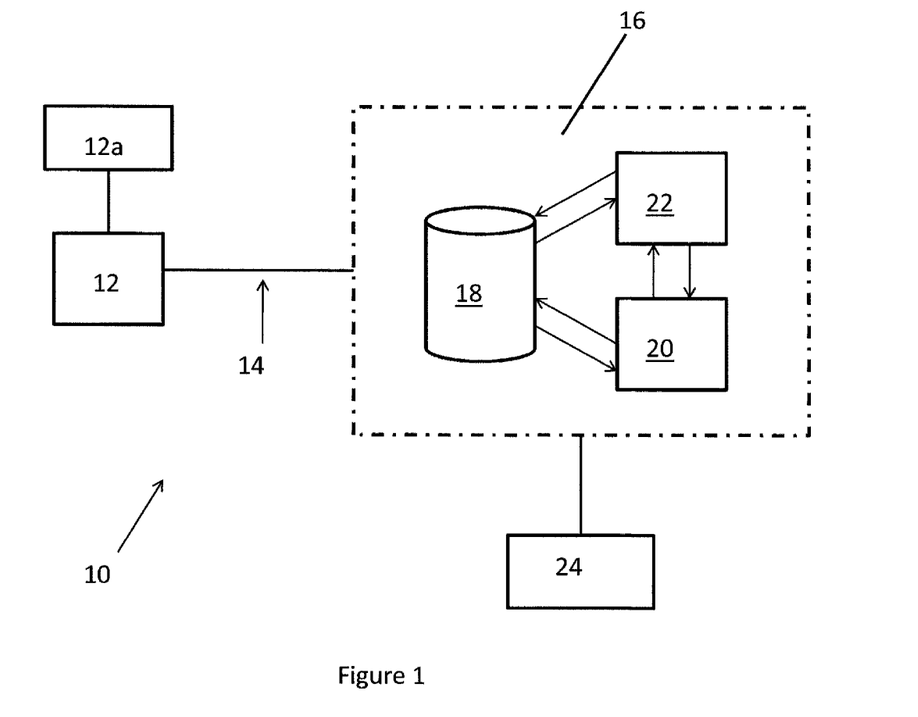
FIG. 1 is a block diagram of a medical imaging system (simplified) operable in accordance with the present invention.

FIG. 1 is a block diagram of a medical imaging system 10 (simplified) that is operable in accordance with the present invention. The system 10 comprises a medical imaging scanner 12 that acquires image data of the anatomical region of interest of a patient under examination and, more particularly in this case, the airways of the patient. As noted above, the scanner 12 may use computed tomography (CT) imaging which has become one of the primary means to examine abnormalities of airways. However, the scanner 12 may use any other appropriate imaging modality to acquire 3D image data, for example, magnetic resonance, ultrasound, and nuclear medicine imaging. The scanner 12 may acquire raw image data from multiple scanned views of the anatomical region of interest, reconstruct the images, and produce an image volume. The image data signals may be in Digital Imaging and Communications in Medicine (DICOM) format. Other formats may also be used.

The imaging scanner 12 is operably connected to a computer system 12a that controls the operation of the scanner 12 and, via a communication channel 14, to an image processing system 16 that processes the image data signals utilizing appropriate image processing software applications. The image processing system 16 typically has an image data archive or database 18, an application server 20, and a user workstation 22. The components of the image processing system 16 are interconnected via a communications network that may be implemented by physical connections, wireless communications, or a combination. The image data archive or database 18 is adapted to store the image data signals that are produced by the image scanner 12 as well as the results of any additional operations on the image datasets by the other components of the image processing system 16. The image data archive or database 18 may be a Picture Archiving and Communications System (PACS). Other types of image data archives or databases may also be used.

The user workstation 22 is adapted to control the operation of the imaging processing system 16 and its various components. The user workstation 22 particularly operates the application server 20 and the various image processing software applications that are stored in, or are accessible by, the server 20. The application server 20 also manages and coordinates the image datasets among the image processing applications. The image processing applications may include, for example, visualizations, computer-aided diagnosis (CAD), medical image rendering, anatomical segmentation, or any other type of medical image processing application. The image processing applications may also include methods implemented according to the present invention. The image data archive or database 18, applications server 20, and the user workstation may also each be connected to a remote computer network 24 for communication purposes or to access additional data or functionality. The workstation 22 may comprise appropriate user interfaces, like displays, storage media, input/output devices, etc.

The various components of the imaging system 10 are conventional and well known components. They may be configured and interconnected in various ways as necessary or as desired. The imaging system 10 and, in particular, the image processing system 16 is adapted to permit the imaging system 10 to operate and to implement methods in accordance with the present invention, for example, as shown in FIG. 2.

Figure 2:
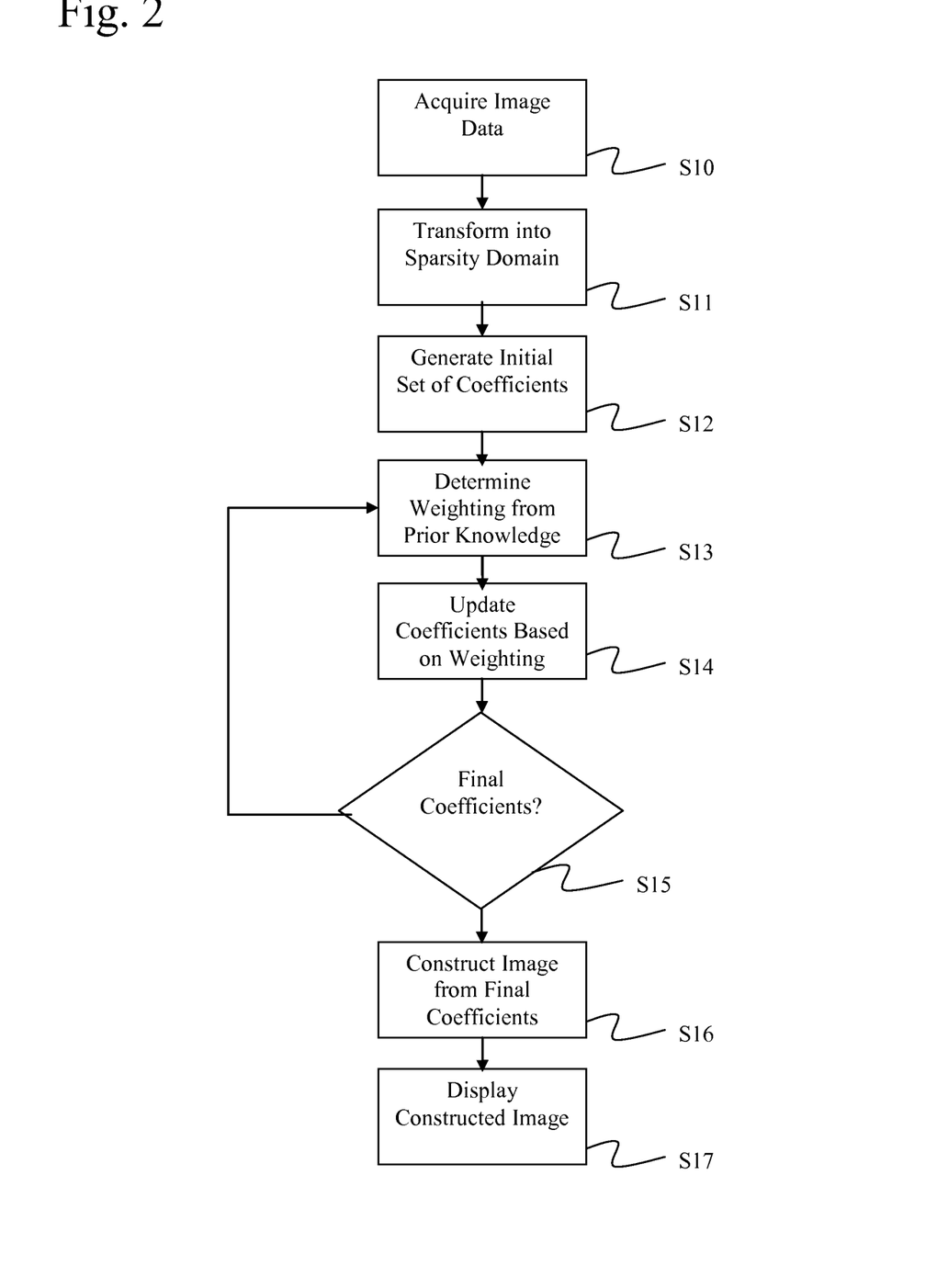
FIG. 2 is a flow chart of a method implemented in accordance with the present invention.

FIG. 2 is a flow chart of a method 100 implemented in accordance with the present invention. Generally, the method 100 carries out steps to extract airway trees from the patient that are obtained at different time-points and to visualize the state of the airways. Using, for example, the imaging system 10 described above, an image of an original CT volume, I, of a patient's airway tree is obtained (Step 102). The image may be obtained in various ways, such as, directly subsequent to a CT scan of the patient; from the image data archive or database 18; or from the remote computer network 24. The imaging system 10 processes the image of the original CT volume I, and obtains an airway segmentation image, $I_S$, from the image of the original CT volume I (Step 104). There are several methods for performing an airway segmentation and, thus, extracting the airway or bronchial tree from the CT dataset (see, for example, those methods described in an article by A. P. Kiraly, G. McLennan, E. A. Hoffman, J. M. Reinhardt, and W. E. Higgins, entitled "Three-dimensional Human Airway Segmentation Methods for Clinical Virtual Bronchoscopy", Academic Radiology, 2002, pp. 1153-1168, vol. 9(10), and also in article by C. I. Fetita, F. Preteux, C. Beigelman-Aubry and P. Grenier, entitled, "Pulmonary Airways: 3-D Reconstruction From Multislice CT and Clinical Investigation", IEEE Trans. Medical Imaging, November 2004, vol. 23, no. 11, each of which is incorporated by reference herein).

From the airway segmentation image $I_S$ (i.e., the segmented bronchial tree), the method 100 creates an airway tree model, T (Step 106) with a hierarchy that represents the bronchial generations. This permits physicians and other health professionals to select specific airways for review and evaluation. The creation of the airway tree model may be accomplished by performing a skeletonization of the airway segmentation image $I_S$, (Step 106a) and taking refinement steps to create a smooth tree model of the segmented airway tree (Step 106b). In brief, skeletonization is a process for reducing foreground image data in an image to a skeletal remnant that preserves the extent and connectivity of the original image. One method for skeletonizing an airway segmentation to create an airway tree model is described in an article by A. P. Kiraly, J. P. Helferty, E. A. Hoffman, G. McLennan, and W. E. Higgins, entitled "Three-Dimensional Path Planning for Virtual Bronchoscopy", In IEEE Transactions on Medical Imaging, September 2004, pp. 1365-1379, vol. 23, no. 9, which is incorporated by reference herein.

The resulting tree model T is a hierarchical description of the airway tree as a connected series of branches. The hierarchical description identifies, for each branch, the parent branch from which each branch is descended and the child branches that are descended from each branch. The description also contains a generation number, starting with 0 for the trachea, 1 for the left and right main bronchi, 2 for the lobar branches, 3 for the segmental branches, 4 for the sub-segmental branches, and so forth. Each branch is itself a series of connected sites, defined by a position in the 3D volume and the orientation of the branch at the corresponding site/location. This information can be used to determine or compute a perpendicular cross-section of a respective site (typically the center point) from which airway quantification of a branch will be performed.

Airway quantification is a process for evaluating airway dimensions, which has been heavily described in medical literature. Two exemplary methods are described in an article by B. Odry, A. P. Kiraly, G. Slabaugh, C. L. Novak, entitled "Active contour approach for accurate quantitative airway analysis", SPIE Medical Imaging 2008, Proceedings of the SPIE, 2008, p. 691613, Vol. 6916; and also in an article by A. P. Kiraly, B. L. Odry, D. P. Naidich, C. L. Novak, entitled "Boundary-Specific Cost Functions for Quantitative Airway Analysis", Medical Image Computing and Computer Assisted Intervention (MICCAI) 2007, pp. 784-79, each of which are incorporated by reference herein. Generally, lumen and wall contours are evaluated, providing measurements, such as, average lumen diameter, minimum and maximum lumen diameters, lumen area, average wall thickness, minimum and maximum wall thicknesses and wall area. A contour, which describes the outline or shape of an airway branch cross-section or an airway branch lumen, usually is defined as a set of 360 points around the axial centerline of a respective airway branch. Each point corresponds to a distance from the edge of the outer walls or the lumen, respectively, to the branch centerline at one specific angle. The points are then computed for 360 degrees around the centerline of the branch.

Figure 3:
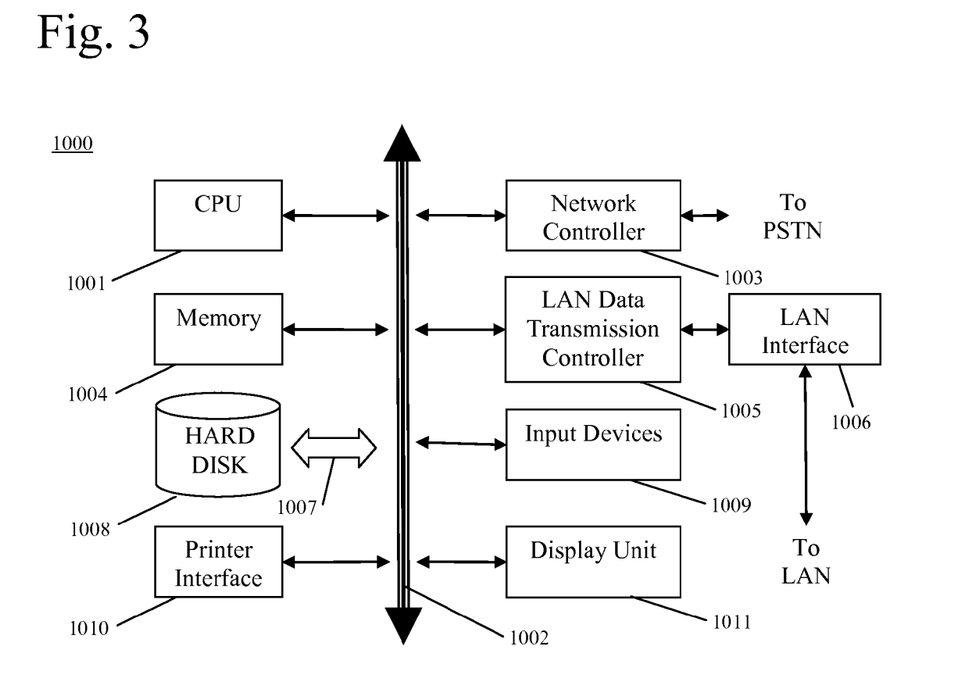
FIG. 3 shows a schematic representation of an idealized cross section of an airway branch.

FIG. 3 illustrates an idealized perpendicular cross-section of an airway branch 30, showing airway branch contours and exemplary measurements that may be extracted. The airway branch 30 is shown as a hollowed tube that has an inner wall 34, which may be used to compute the diameter and/or the area of the airway lumen that is represented by the smaller, inner circle. The airway branch 30 also has an outer wall 36 represented by the periphery or circumference of the larger, outer circle. The contour of the branch 30 is the outline or shape formed by the outer wall 36 and the contour of the lumen is formed by the outline of the inner wall 34 (both shown as circular in the figure, although each is not limited to such a shape). The bronchial wall width may be calculated as the difference between the overall airway branch 30 diameter (starting from the outer wall 36) and the lumen diameter (starting from the inner wall 34), represented as the width of the cross-hatched ring 38. Similarly, the bronchial wall area may be calculated as the difference between the overall airway branch 30 area (area of the larger, outer circle) and the lumen area (area of the smaller, inner circle), represented as the area of the cross-hatched ring 38.

As noted above, the tree model T permits the airways, or airway branches, of interest to be viewed and identified more easily by a system 10 user (Step 108). Airways of interest will usually include all airways, but may optionally be restricted to those airways within a certain size range (e.g., 2 to 10 mm diameter), those airways within a certain generation range (e.g., generations 0 through 5), or those airways in a particular lobe (e.g., the right upper lobe). Once the airways of interest have been identified, the method 100 then carries out steps to automatically identify counterpart airways or branches of interest in a second CT volume (e.g., prior or follow-up volume) of the patient's airway tree (Step 110). This may be accomplished by matching the bronchial tree models as well as surrounding structures (e.g., blood vessels) to a selected airway or branch (see, for example, a method described in an article by J. N. Kaftan, A. P. Kiraly, D. P. Naidich, C. L. Novak, entitled "A novel multipurpose tree and path matching algorithm with application to airway trees", Medical Imaging 2006, Proceedings of the SPIE, 2006, pp. 215-224, vol. 6143, which is incorporated by reference herein).

For example, the imaging system 10 provides an image of a prior or follow up CT volume, $I_2$, of the patient's airway (Step 110a). The imaging system 100 processes the image data (in a manner the same or similar to that described above) to create a second tree model or skeleton, $T_2$, that represents the structure of the bronchial tree structure of the patient at the earlier or later time-point (Step 110b). Without loss of generality, the first tree model T may be called $T_1$ as the method 100 is now further described. It is noted that the method 100 does not depend upon the order in which the datasets are acquired; that is to say, $T_1$ may correspond to an earlier or later time-point than $T_2$. The imaging system 100 stores the image data, including the tree models, of the two bronchial volumes and uses tree and path matching methods to identify the respective counterpart airways and branches (Step 110c). For example, beginning at the $0^{th}$ generation of the first tree model $T_1$, the trachea in the first tree model $T_1$ is matched to the trachea in the second tree model $T_2$. For each subsequent generation i, every branch in the $i^{th}$ generation in the first tree model $T_1$ is matched to the corresponding branch in the second tree model $T_2$ according to which branch at that generation has the closest measurement characteristics, including length and branch angle. As a result, for every branch in the first tree model $T_1$, there is either a matching branch in the second tree model $T_2$ or a null branch, n corresponding to a case where the matching branch cannot be found (e.g., missing branch, insufficiently matching branch). The counterpart airways or branches of interest in a second CT volume may be determined from the matching.

The method 100 automatically performs airway quantification on both the selected airways of interest and the counterpart airways (Step 112). In this way, the outlines or contours for both the lumen and the walls can be displayed side-by-side for comparison. However, such a basic visualization at this point only gives an approximate idea of the anatomical changes of the selected airways that occurred between the different time-points, for example, during the period of treatment for disease of the airways. The method 100 provides an intelligent merge of the two time-point contours for each structure (e.g., pre-treatment and post-treatment) in order to effectively monitor where changes happen along the airway branches and assess the extent of those changes.

Figure 4A:
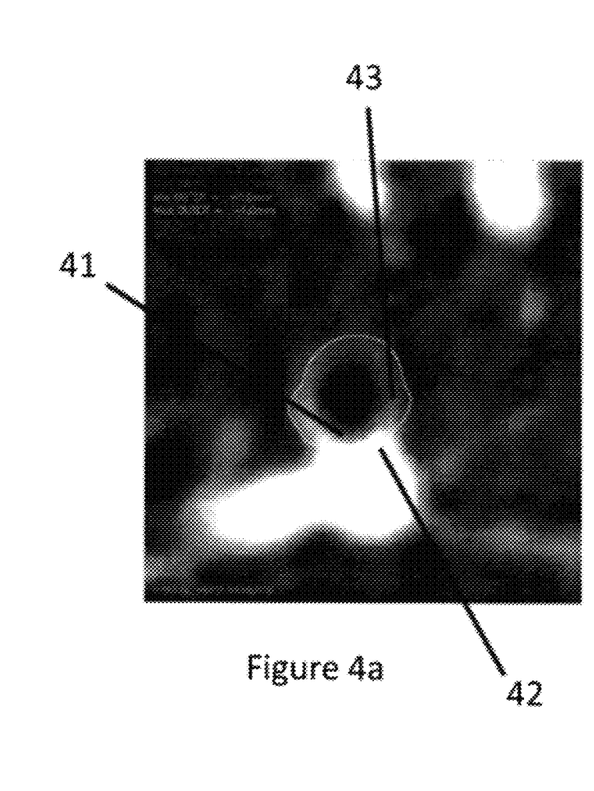
FIG. 4a shows an overlay of pre-treatment contours on a post-treatment cross-section of an airway branch.
Figure 4B:
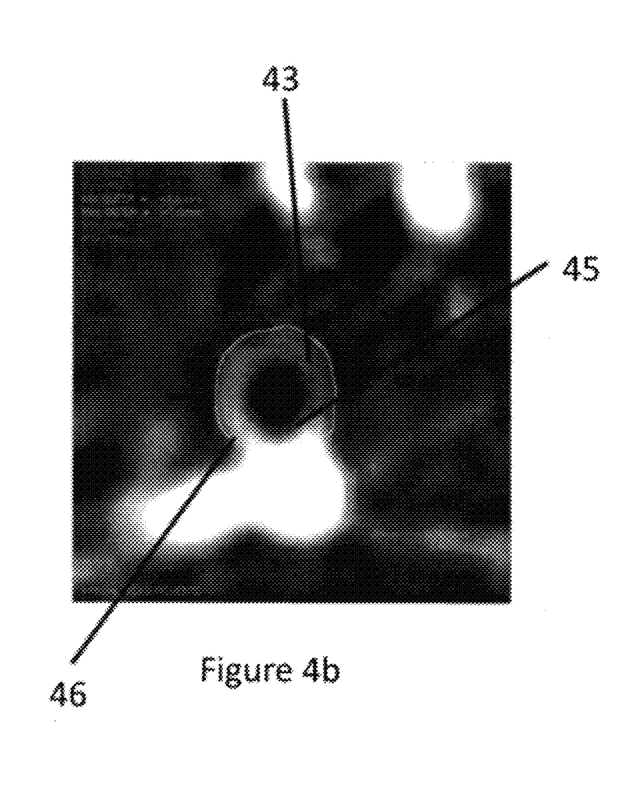

To perform this contour analysis and advanced visualization (Step 114), the method 100 first determines the respective cross-sectional views of the selected airways of interest and the counterpart airways from the pre-treatment and post-treatment images (Step 114a). The cross-sections are registered, for example, using a rigid approach to insure that the three principal axes of both images are as close as possible, and that their orientations along the 3D axes are similar (Step 114b). In addition to visualizing just post-treatment contours, the contours from the pre-treatment cross-section may be overlaid onto the post-treatment cross-section, immediately showing the anatomical differences between the two time-points for both the lumen and walls (Step 114c). This is seen in FIG. 4a which shows an exemplary overlay of pre-treatment contours (lumen contour 41 and wall contour 42) on a post-treatment cross-section 43. FIG. 4b shows an exemplary overlay of post-treatment contours (lumen contour 45 and wall contour 46) on the post-treatment cross-section 43. A system 10 user can interactively switch between the pre-treatment and post-treatment contours to better appreciate the anatomical changes. However, this is not optimal since the back and forth switching between the contours does not allow for precise evaluation.

Figure 5:
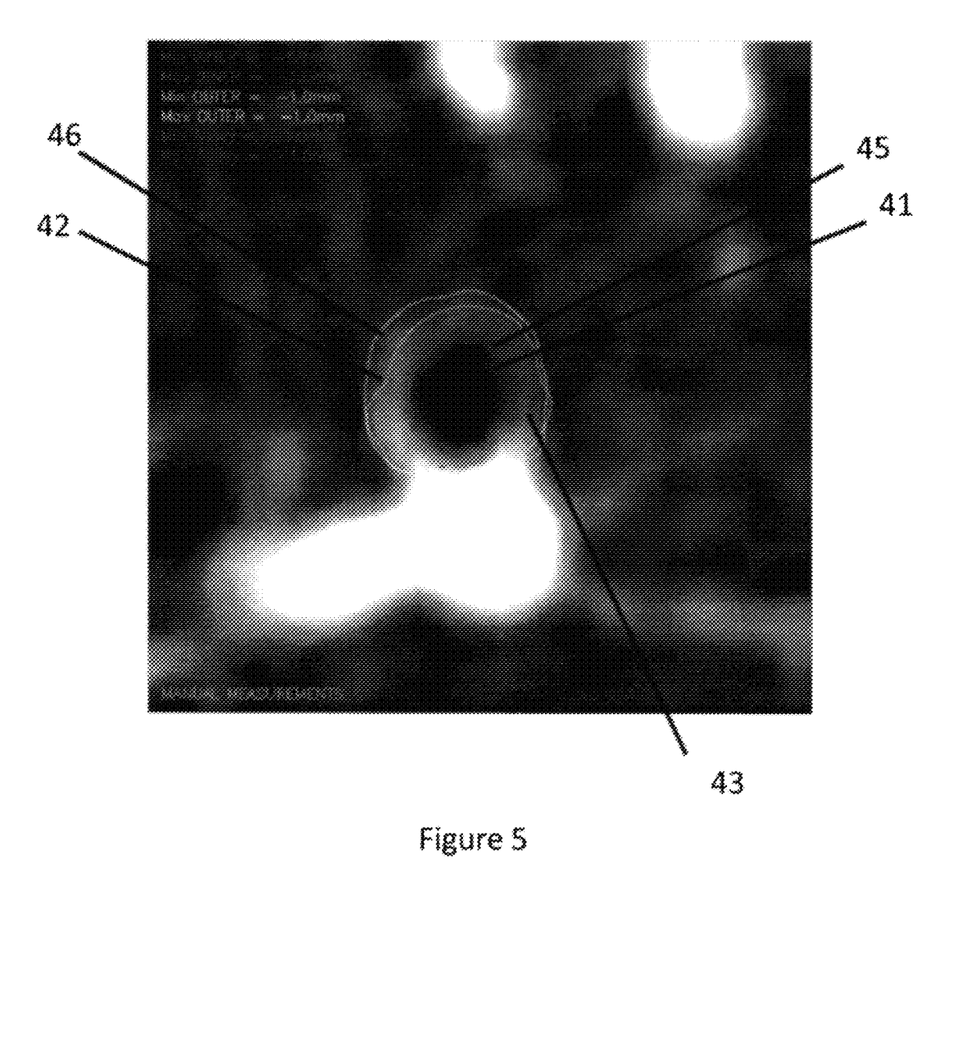

The method 100 furthers the comparison visualization by overlaying both pre-treatment and post-treatment contours on the same post-treatment cross-section (Step 114d). FIG. 5 shows an exemplary combination overlay in which the system 10 user can definitely see where anatomical changes occurred between the different time-points. Although sufficient for some health professionals, this visualization may still be cumbersome to use in practice because the different contours may cross each other many times, as shown in FIG. 5.

The method 100 provides an automatic evaluation of the contour differences with respect to the post-treatment cross-section images (Step 116). This may be accomplished by categorizing the differences in both lumen and walls contours as positive or negative regions depending on whether they correspond to dilatation or shrinkage, respectively, of walls or lumen at the second time-point after the treatment. As noted above, contours usually are defined as a set of 360 points around the axial centerline of a respective airway branch (or lumen) with each point corresponding to a distance from the outer walls (or lumen) to the branch centerline at one specific angle and with the set computed for 360 degrees around the centerline of the branch. The imaging system 10 may use the information for determining the cross-sectional views of the selected airways of interest and the counterpart airways to also ascertain the differences in both walls and lumen contours at the second time-point (Step 116a). An average difference, or delta, indicating the value of increase or decrease of the walls or lumen, is computed for each positive (thickening/dilating) region and each negative (narrowing) region as the difference of distance from the centerline for each point of the respective contour at a specific angle (Step 116b). For each so-called "delta region", the computed average delta is compared to a threshold or reference value in order to eliminate small regions which may mostly exist due to interpolation and quantification differences between the computation of the airway measurements and the determination of the cross sections (Step 116c). Note that the average difference may be computed using various methodologies.

Figure 6A:
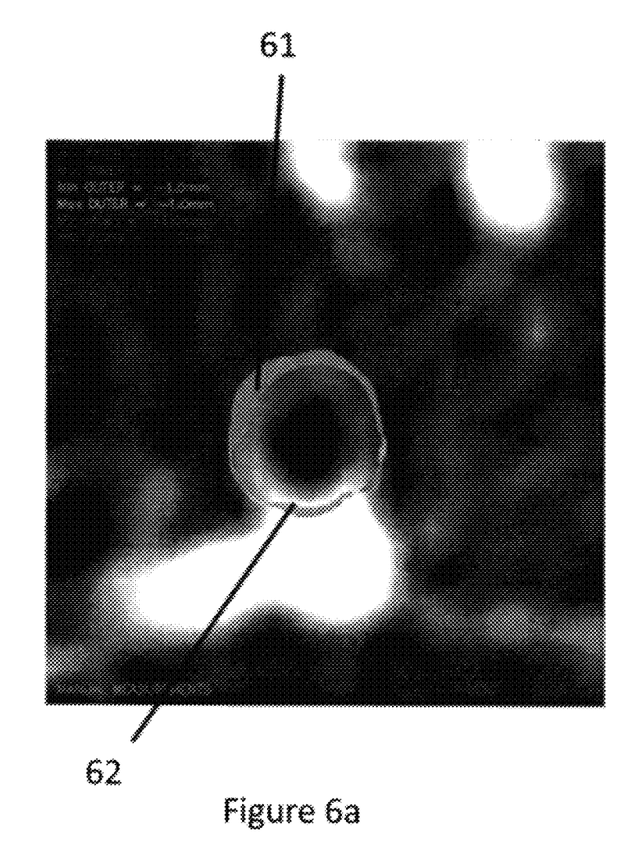
FIGS. 6a and 6b show respective airway branch cross-sections having contour regions coded for thickening and narrowing of the branch walls.
Figure 6B:
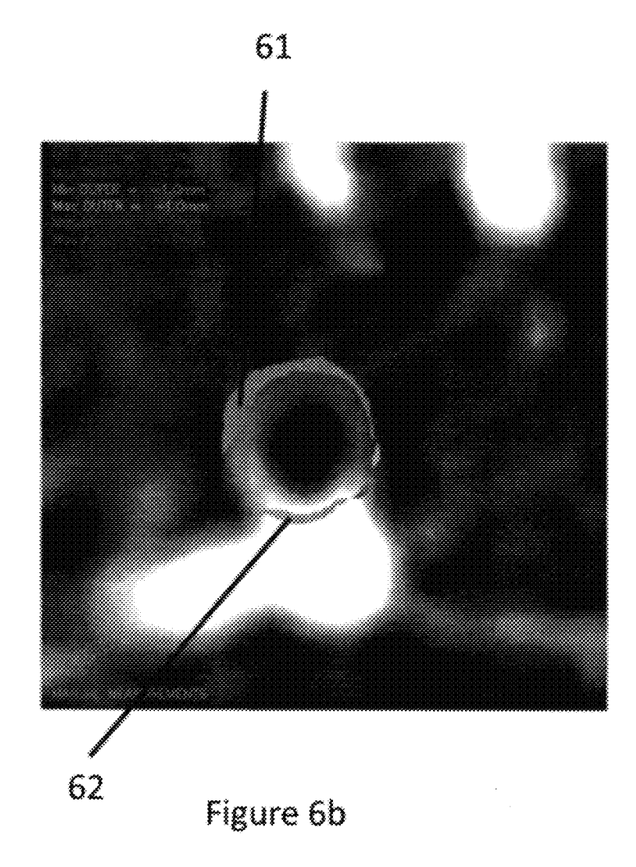

Once small regions are eliminated, the imaging system 10 may provide a coded visualization of the positive and negative "delta regions" to better visualize and assess anatomical changes after treatment (Step 118). For example, a "delta region" may be shown in a discrete color according to whether the "delta region" is positive or negative (Step 118a). FIGS. 6a and 6b show exemplary color-coded visualizations. In particular, FIG. 6a shows an overlay of both pre-treatment and post-treatment contours on the same post-treatment cross-section and wall contour "delta regions" coded for thickening and narrowing of the branch walls. FIG. 6b shows the wall contour "delta regions" of FIG. 6a without specifically depicting the overlay on the post-treatment cross-section. As an example, green coloring may be applied to wall thickening (positive) regions 61 and orange coloring may be applied to wall narrowing (negative) regions 62, although neither coloring is visible in the figures which are depicted in black and white. The coded visualization may also be accomplished using other visual distinctions instead of color coding, for example, gray shading, surface texturing, etc. Additionally, by concurrently displaying indexes of dilatation and shrinkage for lumen and walls, the imaging system 10 permits the health professional to actually verify whether walls have shrunk rather than lumens having dilated (Step 118b).

Figure 7:
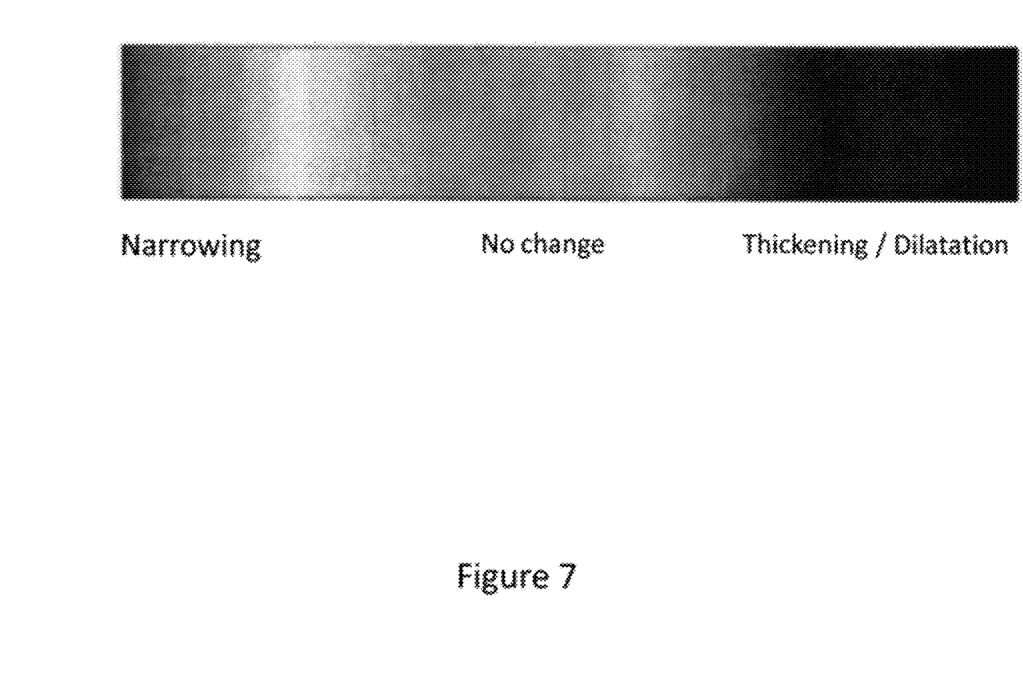
FIG. 7 shows a color scale that may used in a coded visualization of the contours of an airway branch cross-section.

Alternatively, the imaging system 10 may provide a coded visualization wherein each "delta region" is colored according to a continuous color scale to indicate whether the region is positive or negative, i.e., greater or lesser amount of anatomical change, based on the average delta value. FIG. 7 shows an exemplary continuous color scale, ranging from red to violet like a full light spectrum, that may be used to color code the regions. Using this scale, the "delta regions" are colored according to the continuous color scale to indicate greater or lesser amounts of anatomical change with respect to narrowing of a region and thickening or dilatation. The scale may be marked, for example, as follows: red indicates significantly narrower, yellow indicates somewhat narrower, green indicates no significant change, blue indicates somewhat thicker, and violet indicates significantly thicker. Other scales may also be used.

Figure 8A:
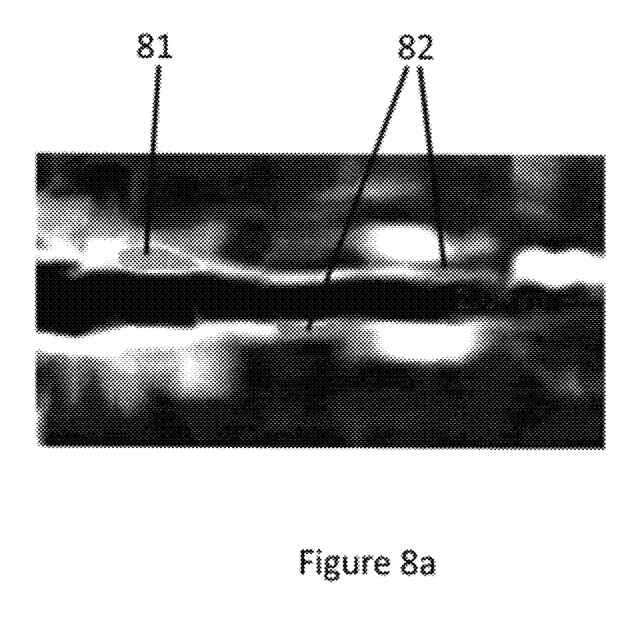
FIGS. 8a and 8b show respective fillet cross-section views of two consecutive airway branches taken at different cross-section angles.
Figure 8B:
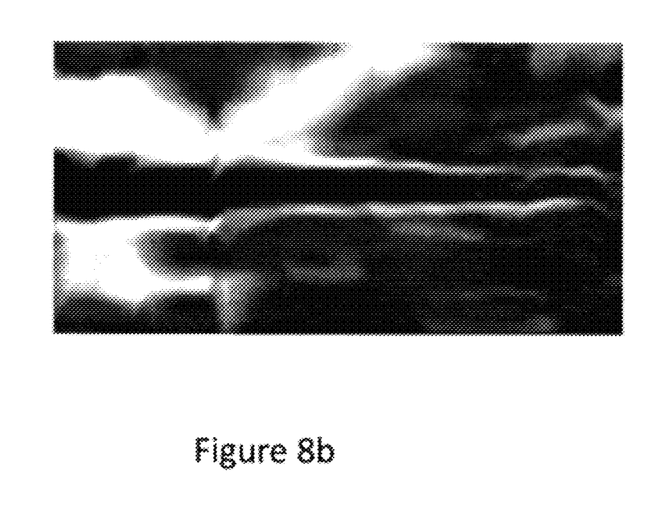

In another embodiment of the present invention, the method 100 may be applied to a selected branch or airway path. Using the airway orientation at each site of a selected branch or a set of branches, the method 100 determines the respective lengthwise cross-sectional view, known as a fillet cross-section. This provides a 2D representation of an airway branch or of an airway path from the trachea to any branch in the bronchial tree. FIGS. 8a and 8b show exemplary fillet cross-sections for two consecutive airway branches (which form an airway path). FIG. 8a shows the fillet cross-section at angle 0 (e.g. 0°) where one thickening region 81 and two narrowing regions 82 may be seen and FIG. 8b shows the same two consecutive airway branches at angle 90 (e.g., 90°) with no detected abnormalities, i.e., no thickening or narrowing regions. In a similar manner as described above, the method 100 computes "delta regions" along the fillet cross-section and visualizes the "delta regions" on the fillet cross-section image. This gives a more global assessment of anatomical changes of an airway branch or set of airway branches. The method 100 may also rotate the visualization around the axis of the fillet cross-section, showing the coded (e.g., color-coded) "delta regions" at any angle, for a comprehensive analysis of the local changes. Using a "delta region" coding visualization, more severe spots along the airway paths can then be easily spotted by system 10 users and examined in other views.

Advantageously, the present invention provides novel visualization methods to depict changes in airway dimensions associated with the progression or regression of disease. The method 100 of the present invention offers significant advantages over other analysis methods in showing in a single glance the diagnostic information needed by a physician or other health professional to answer questions, such as, are the airways changing over time, are the airways getting better or worse over time, how much are the airways changing over time, and where are the airways changing. These questions may be answered with straight-forward, numeric measurements of the airways in the compared datasets and analysis of the results. However, in routine clinical practice, the amount of time that can be spent diagnosing each patient's airways is extremely limited. Thus, a method, like the method 100 of the present invention, that extracts and efficiently presents the relevant information is highly beneficial.

Other modifications are possible within the scope of the invention. For example, the subject patient to be scanned may be a human subject, animal subject or any other suitable object. Also, although the steps of the method 100 have been described in a specific sequence, the order of the steps may be re-ordered in part or in whole and the steps may be modified, supplemented, or omitted as appropriate. Also, the method 100 may use various well known algorithms and software applications to implement the steps and substeps. Further, the method 100 may be implemented in a variety of algorithms and software applications. Further, the method 100 may be supplemented by additional steps or techniques. It is also understood that the method 100 may carry out all or any of the steps using real-time data, stored data from the image data archive or database 18, data from a remote computer network 24, or a mix of data sources.

Also, the various components of the imaging system 10 are conventional and well known components. They may be configured and interconnected in various ways as necessary or as desired. Further, although in the described method 100 the health professional may use self-contained imaging instrumentation and tools, the health professional may use other instrumentation or tools in combination with or in place of the imaging instrumentation and tools described for any step or all the steps of the method 100, including those that may be made available via telecommunication means. Further, the described method 100, or any steps, may be carried out automatically by appropriate imaging instrumentation and tools or with some manual intervention.

It is noted that although the usual practice or typical usage for the method 100 would be to compare bronchial volumes of the same patient, the method 100 may be used to compare bronchial volumes of different patients. This would show differences in disease severity from one patient to another, as opposed to changes in disease over time for one patient. In that case, the respective tree models may be generated at the same time-point or earlier or later time-points.

What is claimed is:

1. A method of visualizing changes in an anatomical airway, comprising:
   a. obtaining image data of a first anatomical airway and a second anatomical airway for comparison;
   b. identifying branches of the first anatomical airway to be visualized and branches of the second anatomical airway that are respective counterparts to the identified branches of the first anatomical airway;

c. deriving contours of each identified branch and corresponding contours of the counterpart branch from the image data;

d. evaluating the contours of each identified branch relative to the corresponding contours of the counterpart branch; and e. visualizing in a coded manner differences between the contours of each identified branch and the corresponding contours of the counterpart branch.

2. The method of claim 1, wherein obtaining image data comprises obtaining an image of a computed tomography (CT) volume of the first anatomical airway and an image of a CT volume of the second anatomical airway.

3. The method of claim 2, wherein obtaining an image of a CT volume comprises obtaining an image directly subsequent to respective CT scans of the first anatomical airway and the second anatomical airway; from an image data archive or database of a CT imaging system; or from a remote computer network operably connected to a CT imaging system.

4. The method of claim 2, wherein obtaining an image further comprises creating respective airway tree models of the first anatomical airway and the second anatomical airway.

5. The method of claim 4, wherein the creating step comprises performing a segmentation of a respective image and performing a skeletonization of the segmented image.

6. The method of claim 2, wherein the image of the CT volume of the second anatomical airway comprises the image of the CT volume of the first anatomical airway obtained at an earlier or later time-point.

7. The method of claim 1, wherein the deriving step comprises performing airway quantification of each identified branch and the counterpart branch.

8. The method of claim 1, wherein the evaluating step comprises determining respective cross-sectional views of each identified branch and counterpart branch and overlaying the contours of an identified branch onto the cross-sectional view of the counterpart branch.

9. The method of claim 1, wherein the evaluating step comprises determining respective cross-sectional views of each identified branch and counterpart branch and overlaying the contours of an identified branch and the contours of the counterpart branch onto the same cross-sectional view of the counterpart branch.

10. The method of claim 9, wherein the evaluating step further comprises registering the respective cross-sectional views of each identified branch and counterpart branch.

11. The method of claim 9, wherein the determining step comprises determining respective fillet cross-sectional views of each identified branch and counterpart branch, the respective fillet cross-sectional views of an identified branch and counterpart branch being taken at a same cross-section angle.

12. The method of claim 9, wherein the determining step comprises determining respective fillet cross-sectional views of each identified branch and counterpart branch, the respective fillet cross-sectional views of an identified branch and counterpart branch being taken over a same set of cross-section angles to produce respective sets of fillet cross-sectional views.

13. The method of claim 12, wherein the visualizing step comprises providing a coded visualization of the differences between the contours that distinguishes between positive regions and negative regions and controllably switching the coded visualization from respective fillet cross-sectional views of an identified branch and counterpart branch taken at a first cross-section angle to the respective fillet cross-sectional views of the identified branch and counterpart branch taken at a second cross-section angle.

14. The method of claim 1, wherein the evaluating step comprises categorizing a difference between the contours as a positive region if the difference corresponds to the contour of an identified branch being larger than the corresponding contour of the counterpart branch and as a negative region if the difference corresponds to the contour of an identified branch being smaller than the corresponding contour of the counterpart branch.

15. The method of claim 14, wherein the categorizing step comprises determining the respective amounts of difference between the contours for each positive region and for each negative region.

16. The method of claim 15, wherein the determining step comprises determining the respective amounts of difference between the contours for each positive region that are greater than a selected threshold amount and the respective amounts of difference between the contours for each negative region that are greater than a selected threshold amount.

17. The method of claim 14, wherein the visualizing step comprises providing a coded visualization of the differences between the contours that distinguishes between positive regions and negative regions.

18. The method of claim 14, wherein the visualizing step comprises providing a color-coded visualization of the differences between the contours that uses a discrete color to represent positive regions and a discrete, different color to represent negative regions.

19. The method of claim 14, wherein the visualizing step comprises providing a color-coded visualization of the differences between the contours that uses a continuous color scale representing respective degrees of differences with respect to positive and negative regions.

20. A computer-assisted method of assessing anatomical changes of an airway, comprising analyzing the contours of a selected branch of the airway imaged at a first time-point and the contours of a corresponding branch of the airway imaged at a second time-point and visualizing the anatomical differences in the contours.

21. The method of claim 20, wherein the analyzing step comprises determining from the first time-point and the second time-point images respective cross-sectional views of the selected branch and the corresponding branch and overlaying the contours of the selected branch onto the cross-sectional view of the corresponding branch to show anatomical differences in the contours from the first time-point to the second time-point.

22. The method of claim 20, wherein the analyzing step comprises determining from the first time-point and the second time-point images respective cross-sectional views of the selected branch and the corresponding branch and overlaying the contours of the selected branch and the contours of the corresponding branch onto the same cross-sectional view of the corresponding branch to show anatomical differences in the contours from the first time-point to the second time-point.

23. The method of claim 20, wherein the analyzing step comprises determining the anatomical differences in the contours from the first time-point to the second time-point by identifying the contour regions that undergo shrinkage and the contour regions that undergo dilatation.

24. The method of claim 23, wherein the analyzing step comprises categorizing the anatomical differences in the contours from the first time-point to the second time-point by determining the respective amounts of shrinkage of contour regions that undergo shrinkage and the respective amounts of dilating of contour regions that undergo dilatation.

25. The method of claim 24, wherein the analyzing step comprises categorizing the anatomical differences in the contours from the first time-point to the second time-point by determining the respective amounts of shrinkage of contour regions that undergo shrinkage that are greater than a selected threshold and the respective amounts of dilating of contour regions that undergo dilatation that are greater than a selected threshold.

26. The method of claim 23, wherein the visualizing step comprises providing a coded visualization of the anatomical differences in the contours from the first time-point to the second time-point that distinguishes between contour regions that undergo dilatation and contour regions that undergo shrinkage.

27. The method of claim 26, wherein the visualizing step further comprises providing respective indexes of dilatation and shrinkage for an airway lumen and airway walls to accompany the coded visualization.

28. The method of claim 23, wherein the visualizing step comprises providing a color-coded visualization of the anatomical differences in the contours from the first time-point to the second time-point that uses a discrete color to represent contour regions that undergo dilatation and a discrete, different color to represent contour regions that undergo shrinkage.

29. The method of claim 23, wherein the visualizing step comprises providing a color-coded visualization of the anatomical differences in the contours from the first time-point to the second time-point that uses a continuous color scale representing respective degrees of change with respect to the dilatation and shrinkage of contour regions from the first time-point to the second time-point.

30. A system for visualizing changes in anatomical airways, comprising a computed tomography (CT) imaging system having an imager that images the anatomical airways to acquire image data and a processor that manipulates the acquired image data and stored image data to perform airway quantification of selected airways and of a counterpart set of airways for comparison; to evaluate contours of the selected airways relative to corresponding contours of the counterpart set of airways; and to obtain a coded visualization of differences between the contours of the selected airways and the corresponding contours of the counterpart set of airways.

* * * * *